US005726146A

United States Patent [19]
Almada et al.

[11] Patent Number: 5,726,146
[45] Date of Patent: Mar. 10, 1998

[54] NON-STEROIDAL, ANABOLIC DIETARY SUPPLEMENT AND METHOD TO INCREASE LEAN MASS WITHOUT LINKED INCREASE FAT MASS

[75] Inventors: Anthony L. Almada, Rio Del Mar; Edward A. Byrd, Pacific Grove, both of Calif.

[73] Assignee: Natural Supplement Association, Incorporated, Golden, Colo.

[21] Appl. No.: 349,863

[22] Filed: Dec. 6, 1994

[51] Int. Cl.$^6$ .................. A61K 38/00; A61K 31/70; A61K 31/715; A61K 31/19

[52] U.S. Cl. .................. 514/2; 514/23; 514/54; 514/60; 514/574; 514/578; 514/634; 514/665

[58] Field of Search .................. 514/2, 23, 54, 514/60, 574, 578, 634, 665

[56] References Cited

U.S. PATENT DOCUMENTS

| | | | |
|---|---|---|---|
| 4,009,265 | 2/1977 | Howard | 424/177 |
| 4,042,688 | 8/1977 | Gans et al. | 424/177 |
| 4,871,550 | 10/1989 | Millman | 424/601 |
| 5,026,721 | 6/1991 | Dubrick et al. | 514/396 |
| 5,175,156 | 12/1992 | Boynton et al. | 514/188 |
| 5,389,395 | 2/1995 | Joseph et al. | 426/72 |

OTHER PUBLICATIONS

Gainers Fuel 1000™ label (1996).
Balsom et al, Sports Med., Creatine in Humans with Special Reference to Creatine Supplementation, V. 4 (1994), pp. 268–280.
Forbes, G.B., American Physiological Society, Exercise and Body Composition, (1991), pp. 994–997.
Kuipers et al, Int. J. Sports Med., Influence of Anabolic Steroids on Body Composition, Blood Pressure, Lipid Profile and Liver Functions in Body Builders, V. 12, (1991), pp. 413–418.
Forbes et al, JAMA, Sequence of Changes in Body Composition Induced by Testosterone and Reversal of Changes After Drug Is Stopped, V. 267, No. 3, (Jan. 15, 1992), pp. 397–399.
Forbes, G.B., American Society for Clinical Nutrition, Do Obese Individuals Gain Weight More Easily Than Nonobese Individuals, V. 52 (1990), pp. 224–227.
Mazess et al, American Society for Clinical Nutrition, Dual–Energy X–Ray Absorptiometry for Total–Body and Regional Bone–Mineral and Soft–Tissue Composition, V. 51 (1990), pp. 1106–1112.
Forbes, G.B., Nutrition Reviews, Exercise and Lean Weight: The Influence of Body Weight, V. 50, No. 6 (Jun. 1992), pp. 157–161.
Heymsfield et al, Nutrition Reviews, Body Composition in Humans: Advances in the Development of Multicompartment Chemical Models, V. 49, No. 4 (Apr. 1991), pp. 97–108.
CA 120:208612, Vinnars et al., 1993.
CA 120:162491, Hultman et al., Feb. 1994.
CA 119:256552, Trimbo et al., 1993.
CA 111:213712, Elam et al., 1989.
Vitamin Bible, Mindell, Warner Books, 1991, pp. 287–290.

*Primary Examiner*—Kimberly Jordan
*Attorney, Agent, or Firm*—Klaas, Law, O'Meara & Malkin, P.C.; Jay K. Malkin

[57] ABSTRACT

Dietary supplement formulation which increases lean body mass without concomitant increase of body fat mass, an effect parallel to that seen with usage of synthetic anabolic steroidal compounds but without adverse side-effects. The formulation composition of the invention comprises creatine, taurine, ribonucleic acid, and optimally, a carbohydrate (starch or a simple saccharide) component for enhancing cellular uptake. Other components such as alpha-ketoglutaric acid and salts thereof, and beta-hydroxy-beta-methyl butyric acid and salts thereof can be added for optimal results. The composition may be taken alone or in combination with a nutrient base, which typically includes protein source(s), carbohydrate(s), vitamin(s), and mineral(s) and other amino acids such as L-Glutamine and other natural L-form non-branched chain or branched chain amino acids. Actual studies in weight trained men show statistically significant increases in lean body mass yet with decreases in fat mass within 28 days.

20 Claims, 5 Drawing Sheets

NON-STEROIDAL, ANABOLIC DIETARY SUPPLEMENT AND METHOD TO INCREASE LEAN MASS WITHOUT LINKED INCREASE FAT MASS

FIELD

This invention relates generally to a dietary formulation which unexpectedly increases lean muscle mass but without the ordinarily attendant increase in fat mass, and more specifically to a novel, non-steroidal, anabolic macronutrient/micro-nutrient/biochemical formulation designed to increase lean muscle mass, without the use of steroidal anabolic agents, among individuals in both healthy and diseased states, and which lean muscle increase is not accompanied by fat mass increase.

BACKGROUND

A variety of intervention methods have been proposed to increase lean mass or decrease fat mass. These methods range from resistance training to anabolic agents (steroidal, growth hormone, insulin-like growth factors I and II, beta-adrenergic agonists, etc.), and combinations thereof. The principal problem in this field, however, is what has been described as one of the cardinal rules of human body composition: The binary rule of linked (or companion) alterations in both fat and lean mass. That is, with dietary intervention, any increases in lean mass are accompanied by increases in fat mass. They are metabolically linked. An example is body composition alteration attendant on overfeeding, either energy or protein plus energy. Conversely, decreases in fat mass are attended by decreases in lean mass, as exemplified by body composition alterations seen with starvation, via energy or energy plus protein restriction. Thus, in weight training, resistance training, body building, strength sports such as football, weight lifting, gymnastics and the like, dietary supplements are conventionally prescribed, typically carbohydrates (fuel) plus protein, along with an appropriate exercise regimen. While these can result in lean body mass increase, the magnitude of increase is far less than with synthetic anabolic agents (steroidal and non-steroidal agents).

To date, the only interventions that have elicited departures from this binary rule have been the use of anabolic agents (growth hormone, beta-adrenergic agonists and anabolic steroids), or to a lesser extent, application of a vigorous exercise program to untrained individuals. However, the use of anabolic steroids and other synthetic agents are accompanied by well-documented negative side effects including impotence, cancer, cardiovascular diseases, diabetes, personality changes, bone and joint abnormalities, shortened life spans and the like.

While the individual components that comprise the novel formulation of this invention are known previously, we are not aware of prior work that teach or suggest any merit to any combination of these components in relation to effecting positive changes in muscle mass. Of the "exotic" compounds that comprise this invention, only creatine has demonstrated an ability to increase total body weight. Studies in humans as far back as 1926 have reported increases in total body mass (comprised of body water, fat mass, bone mass, organ mass, and muscle mass) following creatine administration. However, there has been no characterization of the type of mass increase (i.e., muscle, fat or otherwise) resulting from creatine administration until our work in this area.

Likewise, alpha-ketoglutarate (AKG) has been shown in clinical studies to improve the rate of post-surgical recuperation (decreasing the rate of muscle protein wasting and preserving muscle glutamine content—AKG is a precursor of glutamine), when administered intravenously. However, we are unaware of any studies showing AKG being capable of increasing muscle mass in healthy, metabolically unstressed individuals when administered orally.

Taurine, another compound in our formulation, is the second most abundant amino acid in human skeletal muscle tissue, yet we have not encountered any data supporting its ability to modify skeletal muscle mass, in health or disease.

Yeast-derived RNA is in several medical food and enteral nutrition formulas in light of its documented ability to preserve immune function during periods of severe metabolic stress (infections, e.g. HIV, cancer, post-surgery trauma). Again, as with AKG and taurine, we have encountered no studies that suggest RNA supplementation would augment muscle mass among young, healthy, male, experienced training subjects.

In sum, the prior art does not teach nor suggest how to effectuate, without the use of anabolic drug compounds and their attendant negative side effects, the remarkable metabolic changes that result in accretion of lean muscle mass and not fat mass as effectuated by this invention.

Accordingly, there is a need in the art to provide a food supplement formulation which produces lean mass increase results parallel to those seen with anabolic steroid use but without anabolic drug side effects.

THE INVENTION

Objects

It is among the objects of the present invention to provide a novel dietary formulation that increases lean muscle mass, and in the process breaks the binary rule.

It is another object of the present invention to provide a novel dietary formulation that is designed to increase lean muscle mass but not fat mass.

It is another object of the invention to provide a novel macronutrient/micronutrient/biochemical formulation designed to increase lean muscle mass, without the use of synthetic anabolic agents for individuals in both healthy and diseased states.

Still other objects will be evident from the Specification, Drawings and claims hereof.

Summary

This invention comprises a novel ingestible dietary formulation including the following components: creatine, ribonucleic acid, and taurine, and its method of use in training, treatment or prophylaxis. In the preferred embodiment, alpha-ketoglutaric acid and salts thereof (herein alpha-ketoglutarate) is an added component for optimal results, but is not essential to the invention. In still another optional embodiment, beta-hydroxy-beta-methyl butyric acid or salts thereof (herein beta-hydroxy-beta-methylbutyrate) can also be added to the other three or four components to produce yet another functional composition. This unique combination of components ("active components") is combined with a suitable nutrient base or framework for ingestion by subjects comprising: milk and egg proteins; carbohydrate such as maltodextrin; vitamins; minerals; and L-glutamine. Branched-chain amino acids may be included in the composition. The resulting novel formulation of the invention is referred to herein as "PG," an abbreviation for the proposed trademark of the composition "PHOSPHAGAIN™."

While we do not wish to be bound by theory, we believe that a carbohydrate starch and/or saccharide, such as glucose (dextrose), sucrose, lactose, maltose, galactose or fructose, is important in enhancing the quantity or rate of the body's uptake of creatine. Accordingly, a preferred composition includes a carbohydrate, although separate but associated ingestion or administration of such carbohydrate within a reasonable time span of ingestion of a PG composition of this invention not including the carbohydrate component is within the scope of the invention. For example, a patient may be administered (orally or by IV) a glucose or other simple saccharide solution, and receive PG supplementally and the enhanced uptake effect achieved.

By way of the method aspect of the invention, our studies show that the body composition of resistance-trained men who supplement their diets with the PG composition of this invention exhibit significant increases in lean mass, yet this increase is surprisingly accompanied by decreases in fat mass, as compared to formulations without the PG composition. The effects seen with PG closely parallel the results obtained from treatment with anabolic steroid compounds but without the resultant adverse side effects.

BRIEF DESCRIPTION OF THE DRAWINGS

The invention is illustrated by reference to the drawings, in which.

DETAILED DESCRIPTION OF THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

The unique formulation of this invention comprises the following active components: creatine (monohydrate), ribonucleic acid, and taurine. Alpha-ketoglutarate is a component in the preferred embodiment and should be added for optimal results but is not necessary in order for the invention to work. Optionally, beta-hydroxy-beta-methylbutyrate can be added to produce yet another functional embodiment. As noted above, a carbohydrate component is part of the preferred composition. These components may be taken separately, or preferably are combined with a nutrient base, which typically includes protein source(s), carbohydrate(s), vitamin(s) and mineral(s) and other amino acids such as L-Glutamine and other L-form non-branched chain or branch chained amino acids.

Table 1 below is one example of the composition of the invention. The components and their respective weights per serving (58 grams) and percentages by weight in the preferred embodiment are listed in column A and column B respectively; column C lists the preferred ranges (weight percentage) of the components of the invention composition.

TABLE 1

| Component | A Quantity (g) | B % (w/w) | C % (w/w) |
| --- | --- | --- | --- |
| Milk protein isolates | 10 | 17.2% | 5–50 |
| Calcium Caseinate | 10 | 17.2% | 5–50 |
| Whey protein concentrate | 5 | 8.6% | 5–50 |
| Egg albumin | 2 | 3.4% | 5–50 |
| Corn maltodextrin (intermediate Dextrose Equivalents-a marker of how sweet the maltodextrin is, attributed to free glucose/maltose sugars) | 18 | 31.0% | 5–95 |
| Vitamins and other minerals, flavors, fats and sweetener (Aspartame) | 1.92 | 2.98% | 0–5 |
| HPLC-pure* creatine monohydrate | 6.33 | 10.9% | 0.5–90 |
| L-Glutamine | 2.0 | 4% | 0.5–10 |
| Taurine | 2.0 | 3.45% | 0.5–25 |
| Phosphorus (from potassium, disodium phosphate) | 500 mg | 0.86% | 0.2–5 |
| Yeast RNA | 250 mg | 0.4103% | 0.1–4 |
| ∈ Total = | 58 | 100% | to 100% |

*HPLC = High Performance Liquid Chromatography

The preferred method of delivery of the described invention is by oral ingestion. The formulation is preferably taken as a dietary supplement in at least one (2–4 preferred) aliquots daily. However, any other suitable delivery system may be employed, both enteral to the stomach or digestive tract, or in I.V. parenteral solution form as determined by medical and/or nutritional professionals. For example, in stroke or tracheotomy patients, an intubation (stomach tube) or parenteral delivery system may be employed.

EXAMPLE 1

Measurement of Body Composition Change After Supplementation of Diet With The Composition of the Invention (PG)

This example demonstrates the measured increase in total lean body mass and accompanying decrease in fat mass when human resistance-trained males supplement their diets with the composition of the invention, PHOSPHAGAIN™ (herein PG).

In this study, 28 resistance trained males (age=26±6 years, average training experience=6.7 years, mean training volume prior to entering study=7.6±2 hours/week) were recruited and matched for weight and strength. Subjects were instructed not to alter their diets or training intensity/volume throughout the duration of the study (28 days). Matched subjects were blindly and randomly assigned to supplement their diets with either: (1) 3 servings per day of PG, providing a daily total of 560 kcals, 67 grams of protein, 64 grams of carbohydrates and 5 grams of fat, 150% of the Recommended Daily Intake (RDI) of vitamins and minerals, plus the PG proprietary biochemical matrix (creatine monohydrate, yeast RNA and taurine); (2) 2 servings per day of a commercial high calorie weight gain supplement Gainers Fuel 1000™ from Twin Laboratories, Ronkonkoma, N.Y. (GF), providing a daily total of 1400 kcals, 60 grams of protein, 290 grams of carbohydrates and 1 gram of fat, over 200% of the RDI for vitamins and over 100% of the RDI for minerals; or (3) 3 servings daily of a carbohydrate powder supplement, Maltodextrin (M), providing a total of 760 kcals derived solely from 190 grams of rice-derived maltodextrin, flavor matched to the taste profile of PG.

Table 2 below compares the protein, carbohydrate, fat and calorie content of daily supplements of this invention (PG), maltodextrin (M), and the commercial high calorie weight gain supplement Gainers Fuel (GF) that were given to three groups of resistance trained subjects for the measurement period (28 days).

TABLE 2

| Group | Protein(g) | Carb*(g) | Fat(g) | Kcals |
|---|---|---|---|---|
| Phosphagain (PG) | 67 | 64 | 5 | 560 |
| Maltodextrin (M) | 0 | 190 | 0 | 760 |
| Gainers Fuel (GF) | 60 | 296 | <1 | 1400 |

*Carbohydrates

Table 2 shows the protein, carbohydrate, fat and calorie content of each of the three types of daily supplements taken by the three groups of subjects. Supplementation of all products was for a duration of 28 days. On days 0, 7, 14, and 28 of supplementation, total body water was assessed using a Valhalla 1990b bioelectrical impedance analyzer (BIA) and total body weight and total body composition (minus cranium) were assessed using a Hologic QDR-2000 enhanced array dual energy x-ray absorptiometer (DXA). Data were analyzed by ANCOVA using Day 0 values as the covariate and are presented as mean±standard error changes from Day 0 to Day 28 for the M, PG and GF groups, respectively.

Figure 1:
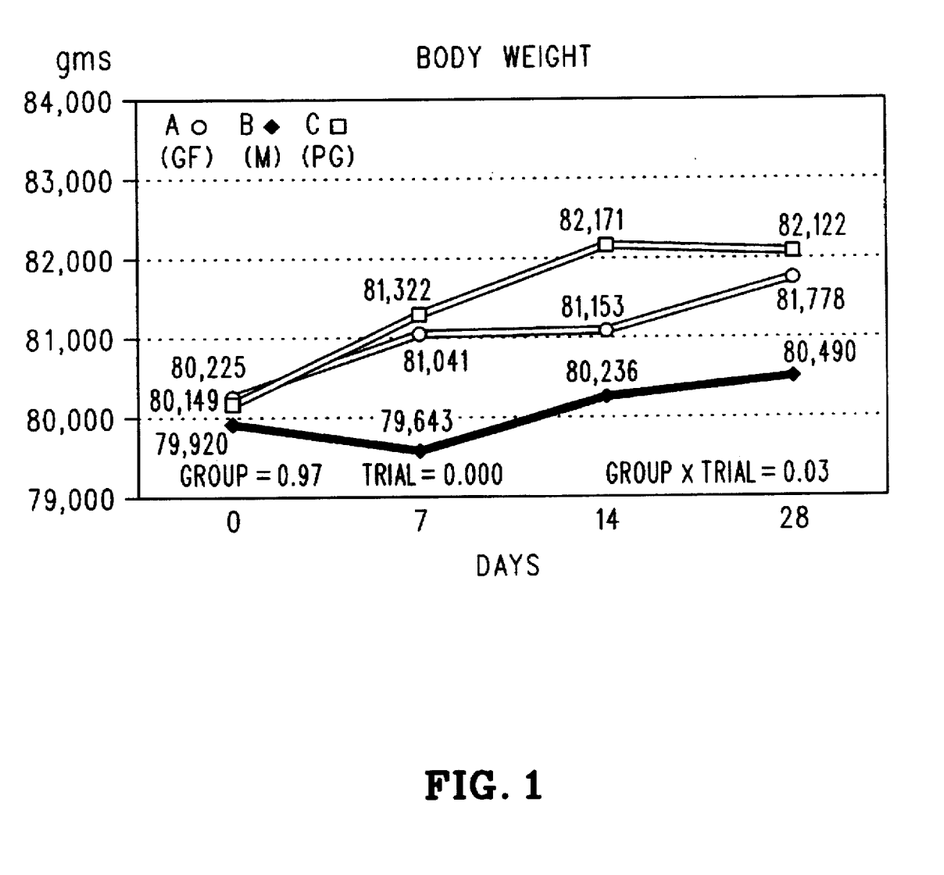
FIG. 1 comparatively illustrates the DXA-determined total body weight of three groups of subjects (A, B, C) during a 28-day period of measurement, one group (C) of which was fed the composition of the invention (PG) as compared to group B, fed a carbohydrate-only supplement (M), and group A, fed a carbohydrate plus protein supplement (GF), resulting in significant increase in total body weight in all three groups during the period of measurement.
Figure 2:
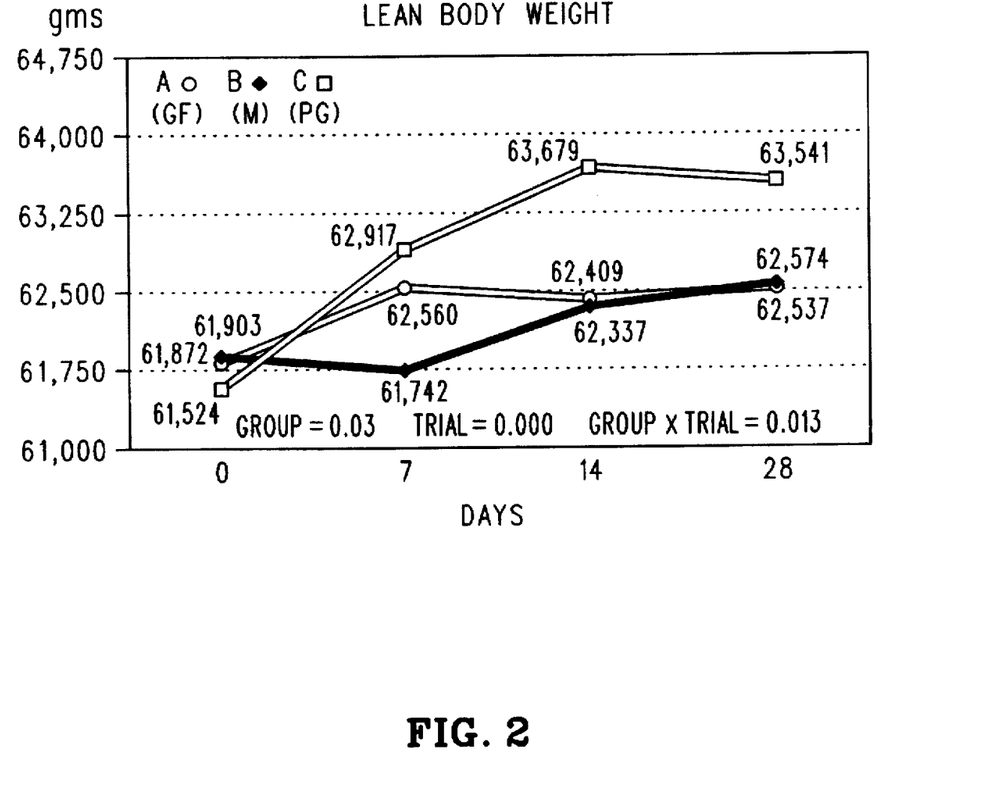
FIG. 2 compares the DXA-determined changes in lean body weight of the three test groups of FIG. 1 during the period of measurement, and shows the group C fed the composition of the invention (PG) has significantly greater increases in lean body weight as compared to those of the M and GF groups, B and A, respectively.
Figure 3:
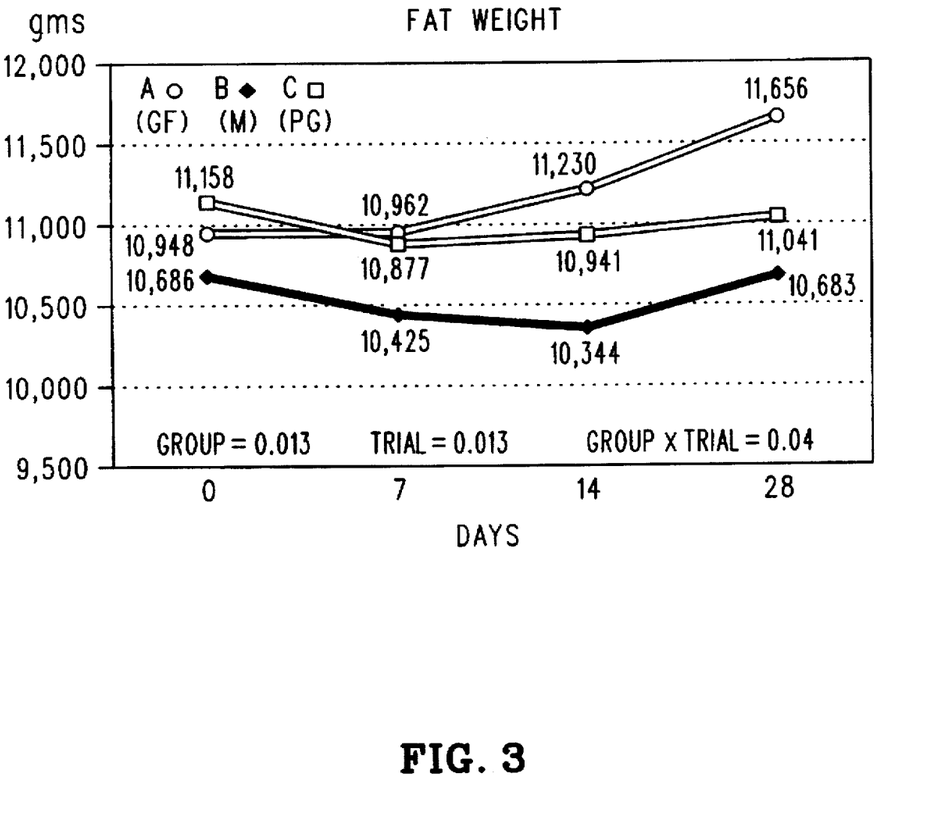
FIG. 3 compares the changes in body fat weight of the three groups of FIGS. 1 and 2 during the period of measurement, and shows both the invention group PG, and the M groups showed slight decreases in fat weight, while the GF group showed an increase in fat weight.
Figure 4:
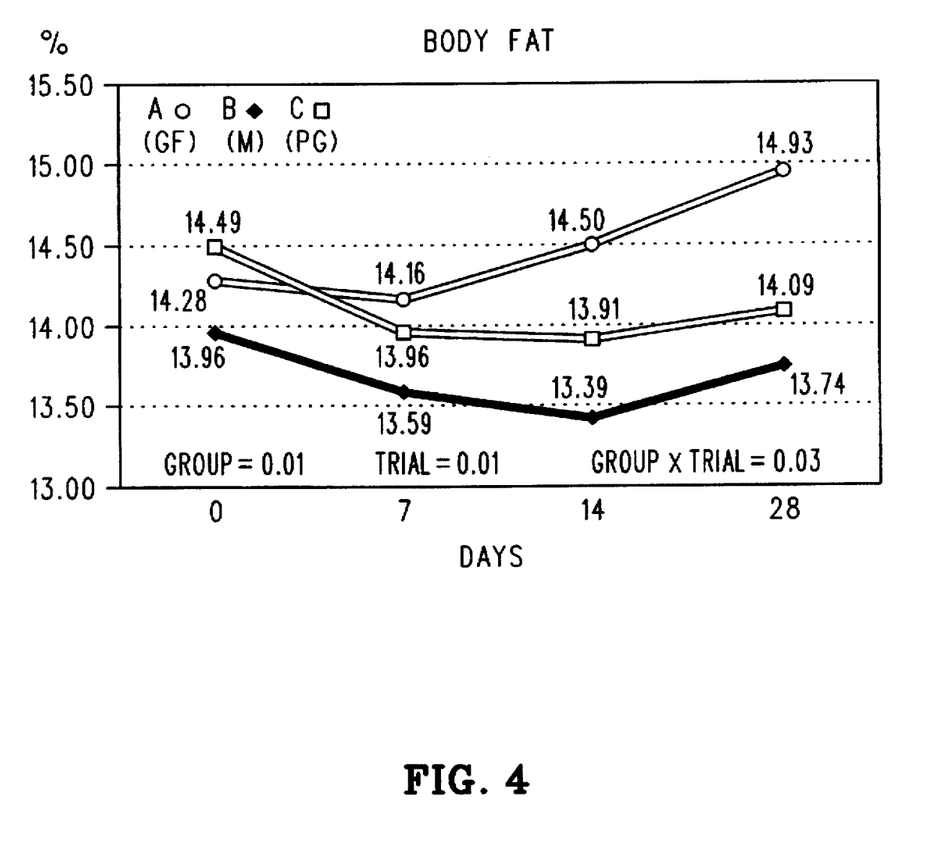
FIG. 4 compares the percent body fat of the three groups of FIGS. 1-3 during the period of measurement, and shows the invention composition group PG exhibited the greatest decrease in percent body fat.

The data from this study is summarized in FIGS. 1-5. As shown in FIG. 1, DXA whole body analysis revealed significant increases in total body weight (in grams on Day 28, M:817±467; PG:1,908±432; GF:1,379±580) in all three groups of subjects. Likewise, as shown in FIG. 2, the lean tissue weight, excluding bone weight, of subjects in all groups increased (in grams on Day 28, M:671±515; PG:2,018±364; GF:665±511), with a significantly greater increase in lean tissue weight observed in the PG group. As shown in FIG. 3, the body fat weight of subjects in the GF group increased (in grams at Day 28, GF:±707±235), while the fat weight of subjects in the M and PG groups decreased (in grams at Day 28 M:−50±234, PG:−116±231), with the PG group showing the greatest decrease in body fat weight. FIG. 4 shows the percent body fat of the subjects in the three groups during the course of the study. The percent body fat increased in the GF group (in percent GF:+0.7±0.3), and decreased in the M and PG groups (M:−0.2±0.3; PG:−0.4±0.3), with the greatest significant percent body fat decrease in the PG group.

Table 3 below shows the body water data for subjects in the three groups who supplemented their diets with PG, M or GF for the measurement period.

TABLE 3

| | | Body Water Data | | | | | |
|---|---|---|---|---|---|---|---|
| Variable | Group | | Day 0 | Day 7 | Day 14 | Day 28 | | P† |
| Total Body Water (Liters) | M | x ± | 53.4 8.8 | 51.8 6.8 | 52.3 6.7 | 52.1 6.2 | Group Trial | 0.93 0.94 |
| | PG | X ± | 52.6 7.7 | 53.4 7.2 | 53.7 6.0 | 53.8 7.0 | Group x Trial | 0.24 |
| | GF | x ± | 51.6 6.5 | 52.4 6.6 | 52.1 7.1 | 52.4 7.6 | | |
| Total Body Water/ Total Body Weight (DXA) (Liters/DXA total) kg | M | x ± | 0.71 0.06 | 0.70 0.02 | 0.70 0.02 | 0.69 0.02 | Group Trial | 0.60 0.47 |
| | PG | x ± | 0.70 0.02 | 0.70 0.03 | 0.70 0.04 | 0.70 0.03 | Group x Trial | 0.65 |
| | GF | x ± | 0.69 0.03 | 0.69 0.03 | 0.69 0.02 | 0.69 0.02 | | |
| Total Body Water/ Total Lean Body Weight (DXA) (Liters/DXA lbw* kg) | M | x ± | 0.86 0.10 | 0.84 0.05 | 0.84 0.04 | 0.83 0.05 | Group Trial | 0.47 0.42 |
| | PG | x ± | 0.86 0.04 | 0.85 0.04 | 0.85 0.06 | 0.85 0.04 | Group x Trial | 0.67 |
| | GF | x ± | 0.84 0.02 | 0.84 0.05 | 0.84 0.06 | 0.84 0.05 | | |

*lbw = lean body weight
x Represents group mean
± Represents standard deviations
† Represents P < 0.05 difference, statistically significant As shown by Table 3, the ratio of total body water (in liters) to DXA total body weight was the same in all three groups and remained constant from Day 0 through Day 28. Likewise, the ratio of total body water (in liters) to DXA lean body weight was the same in all three groups and remained constant from Day 0 through Day 28. Such results conclusively demonstrate that the resulting gain in lean mass observed by the PG group was due to soft tissue protein increases and not water gain.

In summary, the results indicate that while total body weight increased in all groups, supplementation with M resulted in only small increases in lean tissue weight while fat weight was not altered; GF supplementation produced increases in both increased fat weight and in lean tissue of equal magnitude. Lean tissue weight increased to the greatest extent in the PG group while fat weight slightly decreased.

The significant changes in body composition effectuated by PG indicate it is a potent agent to facilitate increased lean tissue accretion in subjects undergoing resistance training: the PG group displayed statistically significant (p=0.03) lean mass increases over 300% greater than those seen either in the M or GF groups. Moreover, the PG group displayed a 2-fold greater decline in total body fat mass and percent body fat relative to the M group. This data also suggests that increased intakes of dietary protein may confer no additional benefit upon facilitating lean mass accretion, and that the unique biochemical composition of PG may exert synergistic effects upon whole body protein turnover, ultimately effecting profound increases in whole body lean tissue mass.

Figure 5:
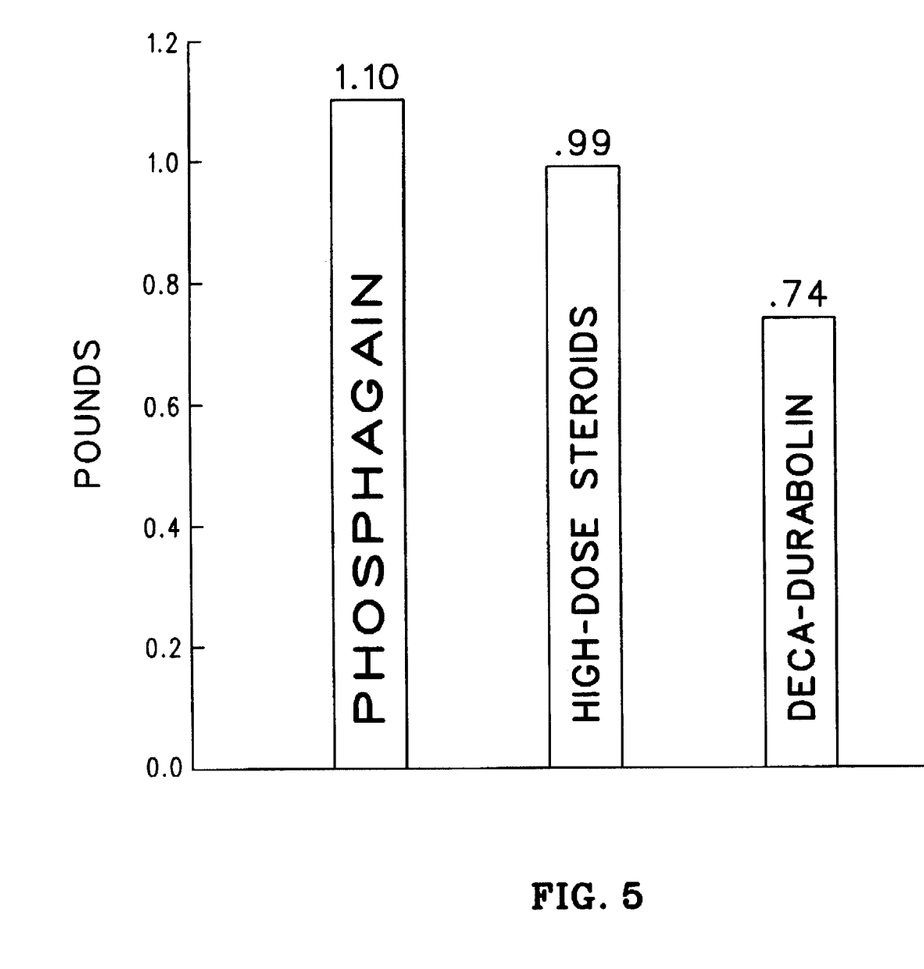
FIG. 5 shows the average lean body mass gained per week by experienced weight trainers on the composition of the invention as compared to anabolic steroid treatment.

The results seen with PG parallel those seen with anabolic steroid usage, but it seems apparent that the biochemical mechanism is different, as no anabolic steroids are employed in PG. Several studies using synthetic anabolic agents have shown increases in lean mass that are within the range (5–10 pounds) seen in the PG group. FIG. 5 shows a comparison of the average lean body mass gained per week by experienced weight trainers undergoing treatment with either PG or anabolic steroids. As shown in the left-hand column, treatment with PG results in a gain of lean mass, on average, of 1.1 pounds per week. As reported by Kuipers H. et al., Int J Sports Med, 12:413 (1991), treatment with high-dose steroids (150–400 mg anabolic steroid injections/week or 2000 mg testosterone injections/week) or treatment with Deca-Durabolin (200 mg Deca-Durabolin injection at Week 1 followed by 100 mg injections weekly) resulted in an average gain in lean mass of 0.99 lbs per week and 0.74 lbs per week, respectively. This is shown in the center and right-hand columns, respectively of FIG. 5. (It should be noted, however, that the amount of the lean mass increase and results of several other steroid studies may be questionable as the methods used to assess lean mass contributions to whole body composition in strength-trained individuals may lead to spuriously high lean body mass, e.g. $^{40}K$ counting or caliper skinfold measurements).

Given the magnitude of the effects of PG upon lean mass, apparently independent of protein and energy intakes (the other two groups treated with M and GF in our study described in Example 1 received equal or greater quantities of protein or carbohydrates respectively), we conclude that our formulation, PG, offers anabolic drug-like lean mass increasing effects but without the adverse side-effects. That is, treatment with PG has the additional advantage that it cannot be accompanied by anabolic drug-like side effects. No significant adverse effects were reported by any of the PG users.

It should be understood that various modifications within the scope of this invention can be made by one of ordinary skill in the art without departing from the spirit thereof. We, therefore wish our invention to be defined by the scope of the appended claims as broadly as the prior art will permit, and in view of the specification if need be.

We claim:

1. A non-steroidal dietary supplement formulation for increasing lean body mass without increasing body fat mass, said formulation comprising creatine, ribonucleic acid, and taurine in a combined amount sufficient to produce an increase in lean mass in a weight-training individual without a linked increase in fat mass.

2. A dietary supplement formulation as in claim 1 further comprising carbohydrate in an amount sufficient to enhance uptake of said formulation.

3. A dietary supplement formulation as in claim 2 further comprising alpha-ketoglutaric acid or a salt thereof.

4. A method of increasing lean body mass without linked increase in fat mass as ordinarily accompanies the use of carbohydrate or carbohydrate/protein dietary supplement comprising the steps of:
   a) supplementing daily dietary intake with a dietary supplement formulation of claim 3, and
   b) engaging in an appropriate exercise regime over a period of time to result in said lean mass increase without substantial increase in percent body fat mass.

5. A dietary supplement formulation as in claim 2 further comprising beta-hydroxy-beta-methylbutyric acid or a salt thereof.

6. A method of increasing lean body mass without linked increase in fat mass as ordinarily accompanies the use of carbohydrate or carbohydrate/protein dietary supplement comprising the steps of:
   a) supplementing daily dietary intake with a dietary supplement formulation of claim 5, and
   b) engaging in an appropriate exercise regime over a period of time to result in said lean mass increase without substantial increase in percent body fat mass.

7. A dietary supplement formulation as in claim 2 further comprising alpha-ketoglutaric acid or a salt thereof, and beta-hydroxy-beta-methylbutyric acid or a salt thereof.

8. A dietary supplement formulation as in claim 7 further comprising a nutrient base comprising at least one component selected from the group consisting of protein, vitamins, minerals and amino acids.

9. A dietary supplement formulation as in claim 2 further comprising a nutrient base comprising at least one component selected from the group consisting of protein, vitamins, minerals and amino acids.

10. A method of increasing lean body mass without linked increase in fat mass as ordinarily accompanies the use of carbohydrate or carbohydrate/protein dietary supplement comprising the steps of:
    a) supplementing daily dietary intake with a dietary supplement formulation of claim 9, and
    b) engaging in an appropriate exercise regime over a period of time to result in said lean mass increase without substantial increase in percent body fat mass.

11. A dietary supplement useful as a training supplement which comprises
    a) a nutrient base comprising protein, vitamins, minerals and at least one amino acid;
    b) a carbohydrate selected from a starch and at least one simple polysaccharide; and
    c) a dietary supplement formulation of claim 1.

12. A dietary supplement as in claim 11 further comprising at least one component selected from the group consisting of alpha-ketoglutaric acid, beta-hydroxy-beta-methylbutyric acid, and salts thereof.

13. A method of increasing lean body mass without linked increase in fat mass as ordinarily accompanies the use of carbohydrate or carbohydrate/protein dietary supplement comprising the steps of:
    a) supplementing daily dietary intake with a dietary supplement formulation of claim 12, and
    b) engaging in an appropriate exercise regime over a period of time to result in said lean mass increase without substantial increase in percent body fat mass.

14. A method of increasing lean body mass without linked increase in fat mass as ordinarily accompanies the use of carbohydrate or carbohydrate/protein dietary supplement comprising the steps of:
    a) supplementing daily dietary intake with a dietary supplement formulation of claim 11, and
    b) engaging in an appropriate exercise regime over a period of time to result in said lean mass increase without substantial increase in percent body fat mass.

15. A method of increasing lean body mass without linked increase in fat mass as ordinarily accompanies the use of carbohydrate or carbohydrate/protein dietary supplements comprising the steps of:
    a) supplementing daily dietary intake with a dietary supplement formulation of claim 1, and
    b) engaging in an appropriate exercise regime over a period of time to result in said lean mass increase without substantial increase in percent body fat mass.

16. A dietary supplement formulation comprising
    a) a component selected from the group consisting of creatine and creatine monohydrate, b) ribonucleic acid, c) taurine, d) an amino acid, and e) alpha-ketoglutaric acid or a salt thereof.

17. A dietary supplement formulation as in claim 16 wherein component a) is creatine monohydrate.

18. A dietary supplement formulation as in claim 16 wherein component d) is L-glutamine.

19. A dietary supplement formulation as in claim 16 further comprising at least one component selected from the group consisting of carbohydrate, protein and fat.

20. A method of increasing lean body mass without linked increase in fat mass as ordinarily accompanies the use of carbohydrate or carbohydrate/protein dietary supplement comprising the steps of;

a) supplementing daily dietary intake with a dietary supplement formulation of claim 16, and b) engaging in an appropriate exercise regime over a period of time to result in said lean mass increase without substantial increase in percent body fat mass.

\* \* \* \* \*